US007920837B2

United States Patent
Rofougaran et al.

(10) Patent No.: US 7,920,837 B2
(45) Date of Patent: *Apr. 5, 2011

(54) METHOD AND SYSTEM FOR UTILIZING UNDERSAMPLING TO REMOVE IN-BAND BLOCKER SIGNALS

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 671 days.

This patent is subject to a terminal disclaimer.

(21) Appl. No.: 11/864,441

(22) Filed: Sep. 28, 2007

(65) Prior Publication Data

US 2009/0088079 A1    Apr. 2, 2009

(51) Int. Cl.
*H04B 1/04* (2006.01)
(52) U.S. Cl. ..... 455/130; 455/139; 455/147; 455/181.1; 455/182.1
(58) Field of Classification Search ............... 455/130, 455/139, 147, 181.1, 182.1, 252.1, 255, 306, 455/307
See application file for complete search history.

(56) References Cited

U.S. PATENT DOCUMENTS

| 3,895,299 | A | * | 7/1975 | Tiedeman, Jr. | 455/237.1 |
| 3,896,399 | A | * | 7/1975 | McDonald | 341/143 |
| 6,175,928 | B1 | * | 1/2001 | Liu et al. | 713/401 |
| 6,864,818 | B1 | * | 3/2005 | Hezar | 341/143 |
| 7,598,893 | B2 | * | 10/2009 | Gunzelmann et al. | 341/144 |
| 2002/0181614 | A1 | * | 12/2002 | Mostafa et al. | 375/316 |
| 2006/0262838 | A1 | * | 11/2006 | Birkett et al. | 375/219 |
| 2009/0088107 | A1 | * | 4/2009 | Rofougaran et al. | 455/151.2 |

OTHER PUBLICATIONS

George L. Matthaei, "Narrow-Band, Fixed-Tuned, and Tunable Bandpass Filters With Zig-Zag Hairpin-Comb Resontators," IEEE Transaction On Microwave Theory and Techniques, vol. 51, No. 4, pp. 1214-1219, Apr. 2003.

Shau-Gang Mao and Yu-Zhi Chueh, "Coplanar Waveguide Bandpass Filters With Compact Size and Wide Spurious-Free Stopband Using Electromagnetic Bandgap Resonators," IEEE Microwave and Wireless components, vol. 17, No. 3, Mar. 2007.

\* cited by examiner

*Primary Examiner* — Tuan A Pham
(74) *Attorney, Agent, or Firm* — McAndrews, Held & Malloy, Ltd.

(57) ABSTRACT

Methods and systems for wireless communication are disclosed and may include band-limiting a wireless signal utilizing a programmable bandpass filter, generating a first signal by undersampling utilizing a clock signal and generating a second signal by undersampling the signal utilizing a delayed version of the clock signal, which may then be subtracted from the first signal. The filter may comprise a microstrip or a coplanar waveguide bandpass filter. The delay may be variable, and may be defined as an inverse of a frequency difference between the desired channel and a blocker signal. The bandwidth of the filter may be centered at the desired channel. The clock signal may be generated at a frequency which may be an integer sub-harmonic of the desired channel, and may be greater than twice a bandwidth of the filter. The delay may be controlled by a programmable delay circuit, which may comprise CMOS inverters.

16 Claims, 8 Drawing Sheets

METHOD AND SYSTEM FOR UTILIZING UNDERSAMPLING TO REMOVE IN-BAND BLOCKER SIGNALS

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for utilizing undersampling to remove in-band blocker signals.

BACKGROUND OF THE INVENTION

In 2001, the Federal Communications Commission (FCC) designated a large contiguous block of 7 GHz bandwidth for communications in the 57 GHz to 64 GHz spectrum. This frequency band may be used by the spectrum users on an unlicensed basis, that is, the spectrum is accessible to anyone, subject to certain basic, technical restrictions such as maximum transmission power and certain coexistence mechanisms. The communications taking place in this band are often referred to as '60 GHz communications'. With respect to the accessibility of this part of the spectrum, 60 GHz communications is similar to other forms of unlicensed spectrum use, for example Wireless LANs or Bluetooth in the 2.4 GHz ISM bands. However, communications at 60 GHz may be significantly different in aspects other than accessibility. For example, 60 GHz signals may provide markedly different communications channel and propagation characteristics, not least due to the fact that 60 GHz radiation is partly absorbed by oxygen in the air, leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for utilizing undersampling to remove in-band blocker signals, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for utilizing undersampling to remove in-band blocker signals. Exemplary aspects of the invention may comprise band-limiting a received wireless signal utilizing a programmable bandpass filter, generating a first signal by undersampling the signal utilizing a clock signal and generating a second signal by undersampling the signal utilizing the clock signal with an added time delay, which may then be subtracted from the first signal. The programmable bandpass filter may comprise a microstrip or a coplanar waveguide bandpass filter. The added time delay may be variable, and may be defined as an inverse of a difference between the desired channel and a blocker signal. The bandwidth of the programmable bandpass filter may be centered at the desired channel. The clock signal may be generated at a frequency which may be an integer sub-harmonic of the desired channel, and may be greater than twice a bandwidth of the programmable bandpass filter. The time delay may be controlled by a programmable delay circuit, which may comprise CMOS inverters.

Figure 1:
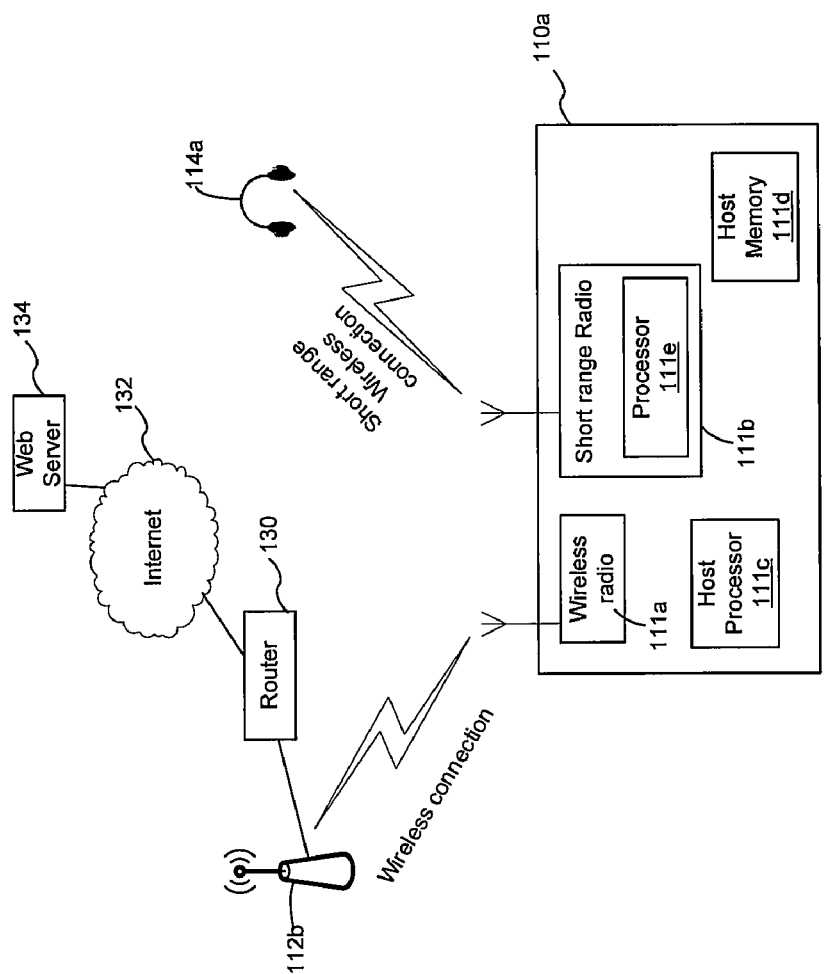
FIG. 1 is a diagram illustrating an exemplary wireless communication system, in accordance with an embodiment of the invention.

FIG. 1 is a diagram illustrating an exemplary wireless communication system, in accordance with an embodiment of the invention. Referring to FIG. 1, there is shown an access point 112b, a computer 110a, a headset 114a, a router 130, the Internet 132 and a web server 134. The computer or host device 110a may comprise a wireless radio 111a, a short-range radio 111b, a host processor 111c, a host memory 111d and a processor 111e. There is also shown a wireless connection between the wireless radio 111a and the access point 112b, and a short-range wireless connection between the short-range radio 111b and the headset 114a.

Frequently, computing and communication devices may comprise hardware and software to communicate using multiple wireless communication standards. The wireless radio 111a may be compliant with a mobile communications standard, for example. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the computer 110a and the access point 112b. Once this connection is established, the streaming content from the Web server 134 may be received via the router 130, the access point 112b, and the wireless connection, and consumed by the computer or host device 110a. The processor 111e may control signal processing, clock signals and delays, for example, in the short range radio 111b.

It may be further desirable for the user of the computer 110a to listen to an audio portion of the streaming content on the headset 114a. Accordingly, the user of the computer 110a may establish a short-range wireless connection with the headset 114a. Once the short-range wireless connection is established, and with suitable configurations on the computer enabled, the audio portion of the streaming content may be consumed by the headset 114a. In instances where such advanced communication systems are integrated or located within the host device 110a, the radio frequency (RF) generation may support fast-switching to enable support of multiple communication standards and/or advanced wideband systems like, for example, Ultrawideband (UWB) radio. Other applications of short-range communications may be wireless High-Definition TV (W-HDTV), from a set top box to a video display, for example. W-HDTV may require high data rates that may be achieved with large bandwidth communication technologies, for example UWB and/or 60-GHz communications.

Undersampling may be utilized to remove blocker signals in 60 GHz wireless systems. If the clock signal for an undersampling process is configured to be an integer sub-harmonic frequency of the desired signal frequency and the clock signal for a second undersampling process is at the same frequency but delayed by a variable time, the reduction and/or elimination of a blocker signal may be optimized. The clock signals and delay time may be controlled by a processor, such as the processor 111e.

Figure 2:
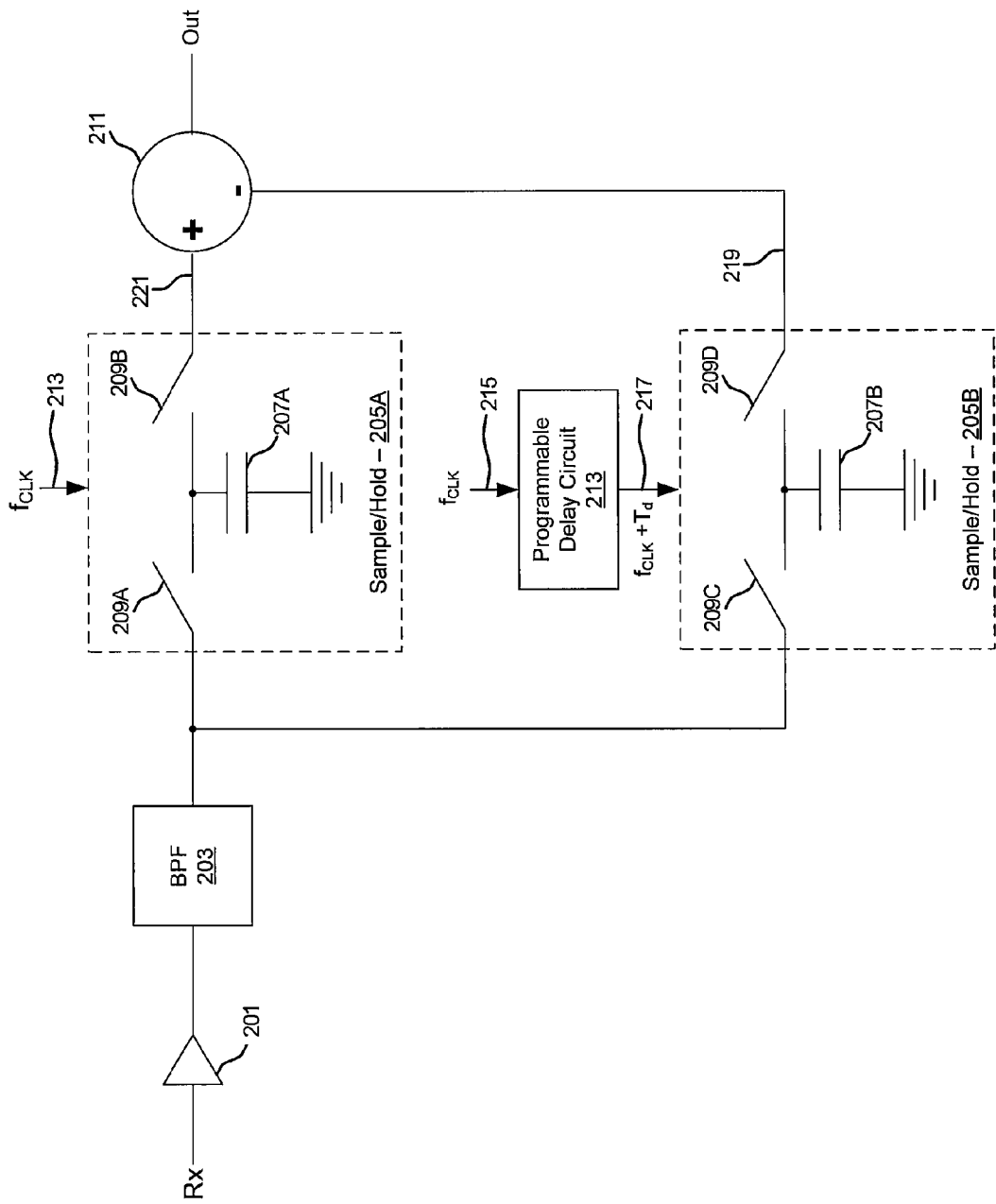
FIG. 2 is a block diagram illustrating a blocker signal filtering system, in accordance with an embodiment of the invention.

FIG. 2 is a block diagram illustrating a blocker signal filtering system, in accordance with an embodiment of the invention. Referring to FIG. 2, there is shown a low noise amplifier (LNA) 201, a band pass filter (BPF) 203, sample and hold circuits (S/H) 205A and 205B, an adder 211 and a programmable delay circuit 213. The S/H circuit 205A may comprise a capacitor 207A and switches 209A and 209B, and the S/H circuit 205B may comprise a capacitor 207B and switches 209C and 209D.

The LNA 201 may comprise suitable circuitry, logic and/or code that may enable the amplification of a received signal. The gain level of the LNA 201 may be adjustable, depending on the magnitude of the received signal and the desired signal level at the output of the LNA 201. The input of the LNA 201 may be enabled to receive an RF signal at a desired frequency. The output of the LNA 201 may be communicatively coupled to the BPF 203.

The BPF 203 may comprise suitable circuitry, logic and/or code that may enable band-limiting a received signal by only allowing a signal within a particular frequency band to pass. The BPF 203 may comprise a programmable microstrip (MS) or coplanar waveguide (CPW) filter, such that the allowed frequency band may be adjustable. The microstrip or coplanar waveguide filter designs may comprise conductive paths in a dielectric material to create a variable inductance and capacitance structure that may be utilized to create a bandpass filter. By changing the dimensions, spacing and/or arrangement of microstrip or coplanar waveguide sections within the bandpass filter, the center frequency and bandwidth may be adjusted. This may be described further with respect to FIG. 3

The S/H circuit 205A and S/H circuit 205B may comprise suitable circuitry, logic and/or code that may enable sampling a received signal at a desired sampling frequency, as indicated by the input clock signal 213, $f_{CLK}$, or delayed clock signal 217, $f_{CLK+Td}$, in FIG. 2. The switches 209A/209B and 209C/209D may open and close at the sampling frequency $f_{CLK}$ to couple the input signal received from the BPF 203. The capacitors 207A and 207B may enable storage of charge to hold the sampled voltage before communicating it to the adder 211. The S/H circuit 205A may be enabled to sample a received input voltage at a sampling frequency of $f_{CLK}$ as indicated in FIG. 2. Similarly, the S/H circuit 205B may be enabled to sample the same received input voltage at a sampling frequency of $f_{CLK}$, but with a time delay, $T_d$, as indicated by the delayed clock signal 217.

The adder 211 may comprise suitable circuitry, logic and/or code that may enable summing signals received at its inputs. In instances where a signal may be communicated to a negative terminal of the adder 211, that signal may be subtracted from a signal communicated to a positive terminal. In this manner, the output signal of the adder 211 may comprise the output of the S/H circuit 205A minus the output of the S/H circuit 205B.

The programmable delay circuit 213 may comprise suitable circuitry, logic and/or code that may enable delaying a clock signal before communicating it to the S/H circuit 205B. The programmable delay circuit 213 may be enabled to tune the delay time of the clock signal 215 to generate the delayed clock signal 217 for the S/H circuit 205B by adding a variable amount of delay to the signal. The programmable delay circuit 213 may comprise CMOS inverter circuits, for example.

In operation, an input RF signal may be communicated to the LNA 201, which may amplify the signal with a desired gain level. The amplified signal may then be communicatively coupled to the BFP 203. The BPF 203 may filter out signals at frequencies except for those within the desired bandwidth. The filtered signal may then be communicated to the S/H circuit 205A and the S/H circuit 205B for undersampling.

Sampling theory may require that to prevent aliasing, a signal may be sampled at twice the frequency of the signal. Accordingly, if a wideband signal may first be bandpass filtered to only the frequency range of interest, then a lower sampling frequency, or twice the bandpass filter bandwidth, may be utilized. In this regard, a microstrip or coplanar waveguide filter may enable receiving signals up to extremely high frequencies. Accordingly the programmable microstrip or coplanar waveguide filter may be centered around a desired RF frequency and the filtered signal may be sampled at a frequency twice the bandwidth of the filter rather than at twice the frequency of the received RF signal. For example, a received signal may comprise a 60 GHz carrier modulated by a signal with baseband bandwidth of less than 5 Ghz. In this manner, the microstrip filter may be controlled to be centered at 60 Ghz with a bandwidth of 5 GHz and the resulting signal may be sampled at 10 GHz, rather than the 120 GHz sampling rate required by signal theory for the received RF signal without band-limiting.

In instances where a blocking signal may be present, such as from an interference source, the S/H circuit 205B may be utilized to remove the blocker signal. The frequency offset Δf, or frequency difference between the desired channel and the blocker signal may be utilized to adjust the time delay, $T_d$, for the delayed clocking signal 217 for the S/H circuit 205B. $T_d$ may be defined as the inverse of Δf, and may be generated by the programmable delay circuit 213 comprising CMOS buffers or inverters, for example. The frequency offset, Δf, may be negative for blocker signals with a frequency less than the signal frequency, and positive for blocker signal frequencies greater than the signal frequency.

Subtracting the second undersampled signal 219, generated by the S/H circuit 205B, from the first undersampled signal 221, generated by the S/H circuit 205A at the adder 211, may result in the desired signal with the blocker signal removed at the output of the adder 211.

Figure 3A:
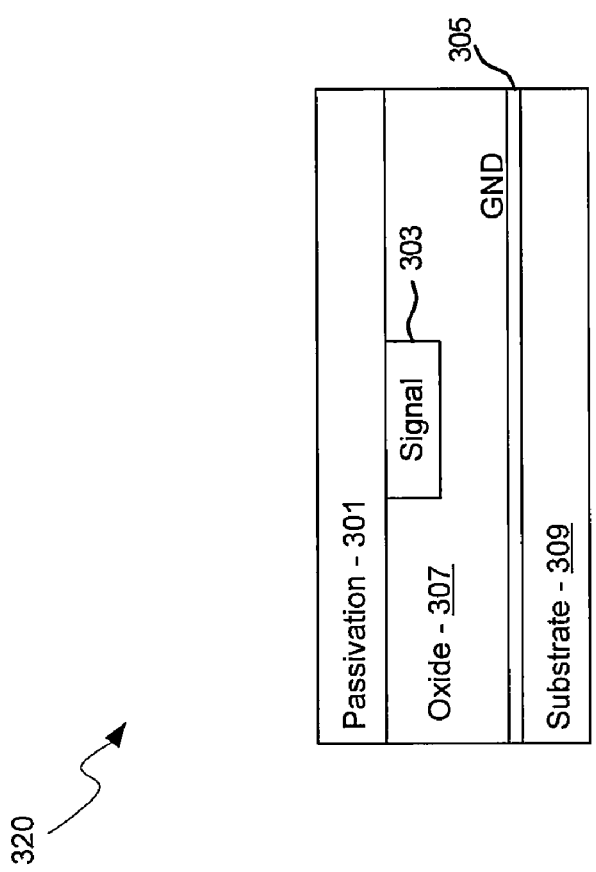
FIG. 3A is a block diagram illustrating a cross sectional view of a microstrip bandpass filter, in accordance with an embodiment of the invention.

FIG. 3A is a block diagram illustrating a cross-sectional view of a microstrip bandpass filter, in accordance with an embodiment of the invention. Referring to FIG. 3A, there is shown a microstrip bandpass filter (MS-BPF) 320. The MS-BPF 320 may comprise a passivation layer 301, a signal conductive line 303, a ground plane 305, an oxide layer 307 and a substrate 309.

The passivation layer 301 may comprise an oxide, nitride or other insulating layer that may provide electrical isolation between the signal conductive line 303, the ground plane 305 and other circuitry on the substrate 309. The passivation layer 301 may provide protection from environmental factors for the underlying layers of the MS-BPF 320. In addition, the passivation layer 301 may be selected based on its dielectric constant and its effect on the electric field that may be present between conductive lines.

The signal conductive line 303 may comprise metal traces embedded in the oxide layer 307. In another embodiment of the invention, the signal conductive line 303 may comprise poly-silicon or other conductive material. The separation and the voltage potential between the signal conductive line 303 and the ground plane 305 may determine the electric field generated therein. In addition, the dielectric constant of the oxide 307 may also determine the electric field between the signal conductive line 303 and the ground plane 305.

The oxide layer 307 may comprise $SiO_2$ or other oxide material that may provide a high resistance insulating layer between the signal conductive line 303 and the ground plane 305. In addition, the oxide layer 307 may provide a means for configuring the electric field between the signal conductive line 303 and the ground plane 305 by the selection of an oxide material with an appropriate dielectric constant.

The substrate 309 may comprise a semiconductor or insulator material that may provide mechanical support for the MS-BPF 320 and other devices that may be integrated. The substrate 309 may comprise Si, GaAs, sapphire, InP, GaO, ZnO, CdTe, CdZnTe and/or $Al_2O_3$, for example, or any other substrate material that may be suitable for integrating coplanar waveguide structures.

In operation, an AC signal may be applied across the signal conductive line 303 and the ground plane 305. The spacing between the conductive line 303 and the ground plane 305, as well as the pattern of the conductive lines, may generate an inductance and a capacitance that may be utilized for filtering purposes, specifically bandpass filtering, in the present invention. In addition, programmable impedances may be coupled across the microstrip devices in the MS-BFP 320 to tune the center frequency and bandwidth and will be described further with respect to FIG. 3B. The MS-BPF 320 may enable the undersampling of received signals at a much lower sampling frequency than without filtering. Two undersampling processes may be enabled, one with a sampling frequency at an integer sub-harmonic of a desired signal and the other at the same sampling frequency but with an added time delay, defined by the frequency difference between the desired signal and the location of a blocker signal, such that the blocker signal may be subtracted from the desired signal.

Figure 3B:
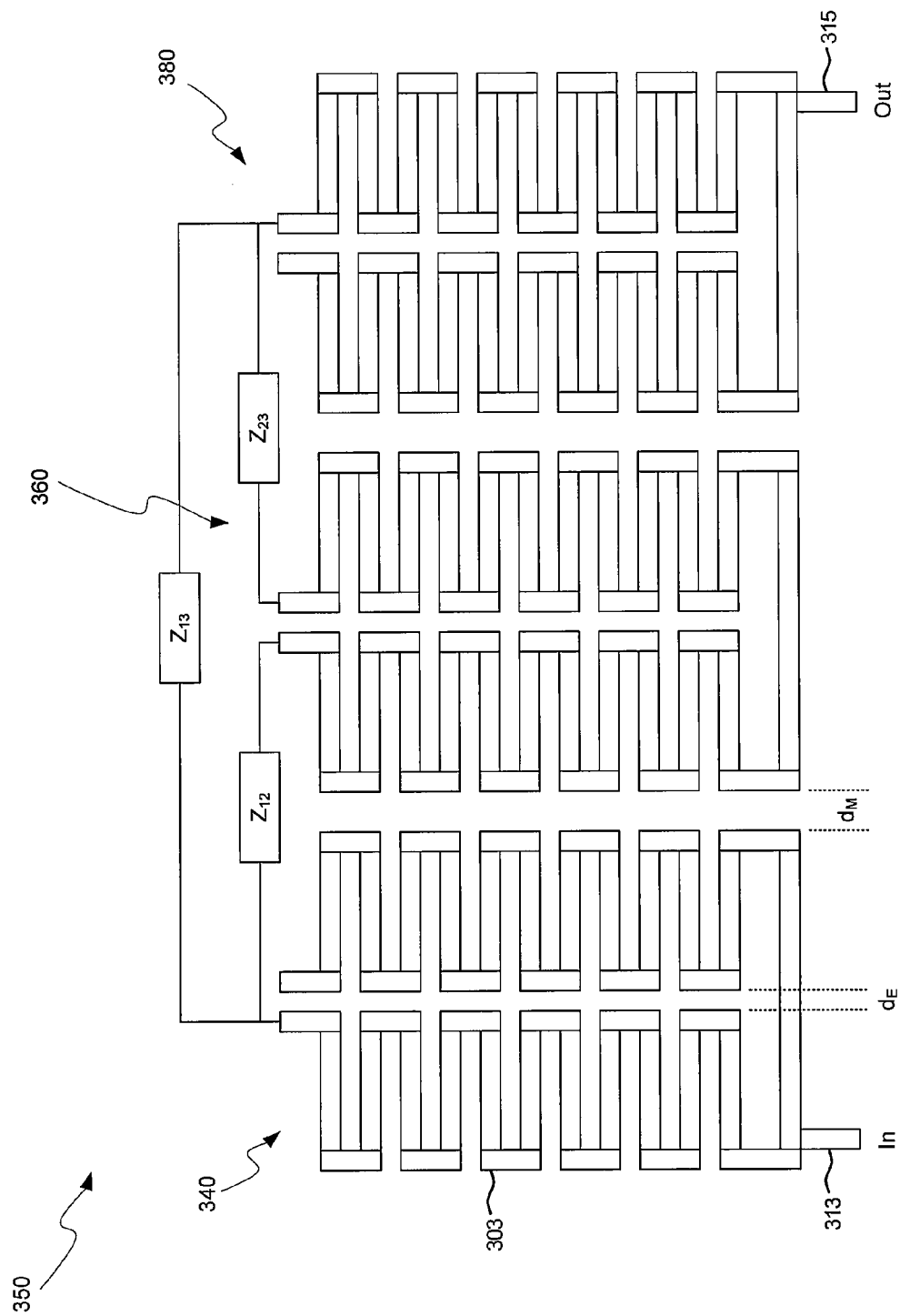
FIG. 3B is a block diagram of an exemplary microstrip bandpass filter, in accordance with an embodiment of the invention.
Figure 3C:
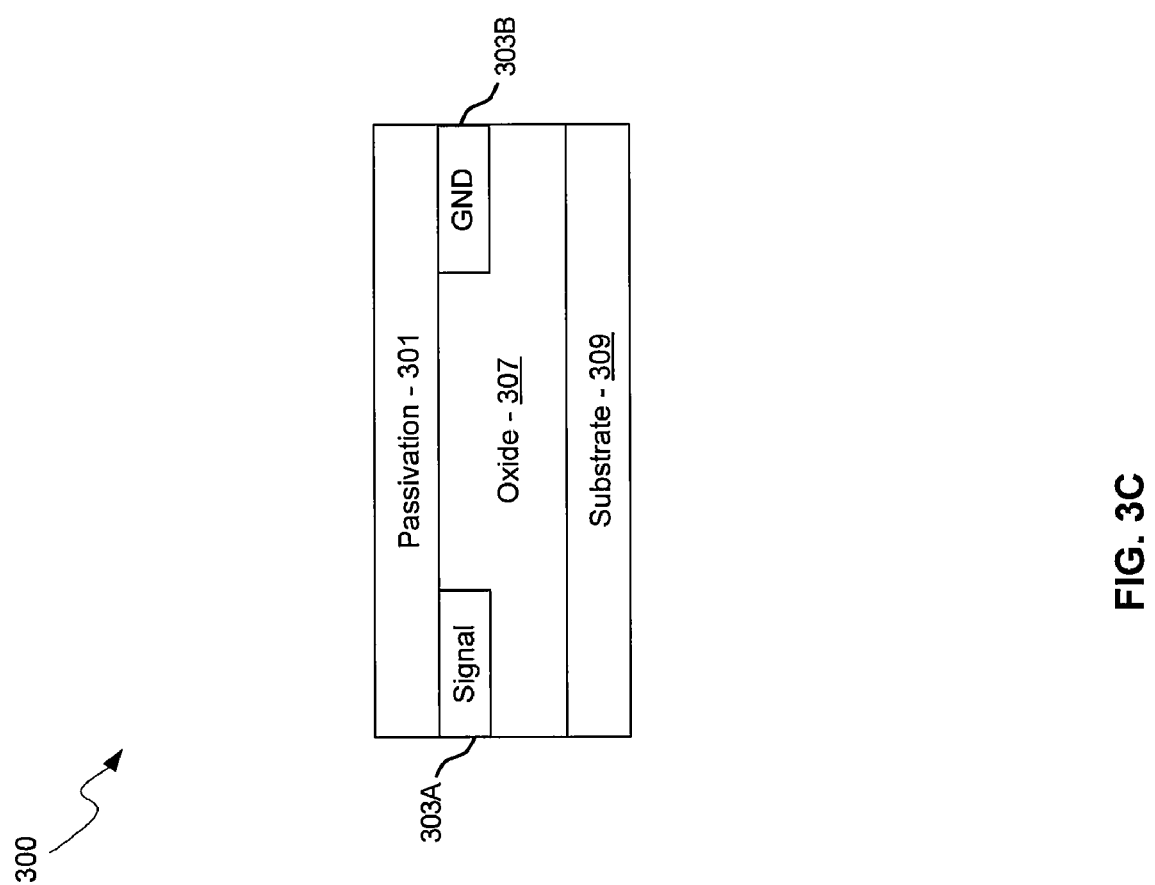
FIG. 3C is a block diagram illustrating a cross sectional view of a coplanar waveguide bandpass filter, in accordance with an embodiment of the invention.

FIG. 3B is a block diagram of an exemplary microstrip bandpass filter, in accordance with an embodiment of the invention. Referring to FIG. 3C, there is shown a microstrip bandpass filter 350 comprising three resonator sections 340, 360 and 380, an input coupler 313 and an output coupler 315. Each resonator section 340, 360 and 380 may comprise a pattern of signal conductive line 303. In addition, there is shown programmable impedances $Z_{12}$, $Z_{23}$ and $Z_{13}$. The pattern of signal conductive line 303 is an exemplary embodiment. The invention is not limited to this type of structure, as any number of patterns may be utilized to create a bandpass filter. Changing the shape may change the frequency response of the MS-BPF 350. In this manner, the frequency response may be tuned to a particular range with the design of the signal conductive line 303, and fine tuning may be accomplished by adjusting the programmable impedances $Z_{12}$, $Z_{23}$ and $Z_{13}$.

The signal conductive line 303 may be as described with respect to FIG. 3A. The programmable impedances may comprise inductors and/or capacitors that may be programmably adjusted by a processor, such as the processor 111e described with respect to FIG. 1, to modify the center frequency and bandwidth of the MS-BPF 350. The number and location of the impedances $Z_{12}$, $Z_{23}$ and $Z_{13}$ is not limited to the configuration shown in FIG. 3B. Accordingly, any number of impedances may be used at multiple locations within the MS-BPF 350.

The input and output couplers 313 and 315 may comprise inductive tap couplings for communicating signals into and out of the MS-BPF 350, respectively. In another embodiment of the invention, the input and output couplers 313 and 315 may comprise series-capacitance couplers.

In operation, an input signal may be communicated to the MS-BPF 350 via the input coupler 313. The desired frequency of operation may be configured by a processor, such as the processor 111e described with respect to FIG. 1, by programming the impedances of the programmable impedances $Z_{12}$, $Z_{23}$ and $Z_{13}$. The filtered output signal may be communicated from the output coupler 315.

FIG. 3C is a block diagram illustrating a cross-sectional view of a coplanar waveguide bandpass filter, in accordance with an embodiment of the invention. Referring to FIG. 3C, there is shown a coplanar waveguide bandpass filter (CPW-BPF) 300. The CPW-BPF 300 may comprise a passivation layer 301, a signal conductive line 303A, a ground conductive line 303B, an oxide layer 307 and a substrate 309.

The passivation layer 301 may comprise an oxide, nitride or other insulating layer that may provide electrical isolation between the conductive lines 303A and 303B and other circuitry on the substrate 309. The passivation layer may provide protection from environmental factors for the underlying layers of the CPW-BPF 300. In addition, the passivation layer 301 may be selected based on its dielectric constant and its effect on the electric field that may be present between conductive lines.

The signal and ground conductive lines 303A and 303B may comprise metal traces embedded in the oxide layer 307. In another embodiment of the invention, the conductive lines may comprise polysilicon or other conductive material. The separation and the voltage potential between the signal conductive line 303A and the ground conductive line 303B, as well as the dielectric constant of the oxide 307 may determine the electric field generated therein.

The oxide layer 307 may comprise $SiO_2$ or other oxide material that may provide a high resistance insulating layer between the signal conductive line 303A and the ground conductive line 303B. In addition, the oxide layer 307 may provide a high resistance insulating layer between the substrate 309 and the conductive lines 303A and 303B.

The substrate 309 may comprise a semiconductor or insulator material that may provide mechanical support for the CPW-BPF 300 and other devices that may be integrated. The substrate 309 may comprise Si, GaAs, sapphire, InP, GaO, ZnO, CdTe, CdZnTe and/or $Al_2O_3$, for example, or any other substrate material that may be suitable for integrating coplanar waveguide structures.

In operation, an AC signal may be applied across the signal conductive line 303A and the ground conductive line 303B. The spacing between the conductive lines as well as the pattern of the conductive lines may generate an inductance and a capacitance that may be utilized for filtering purposes, specifically bandpass filtering, in the present invention. In addition, programmable impedances, which may be configured by a processor, such as the processor 111e described with respect to FIG. 1, may be coupled across coplanar waveguide devices in the CPW-BPF 300 to tune the center frequency and bandwidth, and will be described further with respect to FIG. 3D.

The CPW-BPF 300 may enable the undersampling of received signals at a much lower sampling frequency than without filtering. Two undersampling processes may be enabled, both at the same frequency but one with a time delay, defined by the frequency difference between the desired signal and the location of a blocker signal, such that the blocker signal may be subtracted from the desired signal.

Figure 3D:
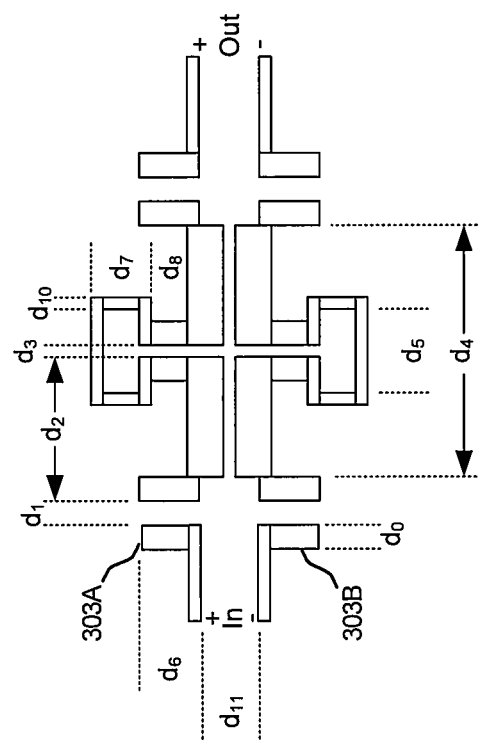
FIG. 3D is a block diagram of an exemplary coplanar waveguide bandpass filter, in accordance with an embodiment of the invention.

FIG. 3D is a block diagram of an exemplary coplanar waveguide bandpass filter, in accordance with an embodiment of the invention. Referring to FIG. 3D, there is shown a coplanar waveguide bandpass filter 325 comprising the signal conductive line 303A and the ground conductive line 303B embedded within an oxide layer and covered with a passivation layer as described with respect to FIG. 3C. The signal conductive line 303A may be as described with respect to FIG. 3C. The pattern of signal conductive line 303A and the ground conductive line 303B is an exemplary embodiment. The invention is not limited to this type of structure, as any number of patterns may be utilized to create a bandpass filter.

In operation, an input signal may be communicated to the MS-BPF 350 at the plus and minus inputs labeled as "In" in FIG. 3D. The desired frequency of operation may be configured by the design of the conductive lines 303A and 303B. Changing the shape may change the frequency response of the CPW-BPF 325. In this manner, the frequency response may be tuned to a particular range with the design of the signal conductive line 303A and the ground conductive line 303B. Tuning may be accomplished by adjusting the dimensions of the structure, via switching sections in and out of the structure, for example. In another embodiment of the invention, tuning may be accomplished by suspending portions of the CPW-BPF 325 over the substrate with an air gap. By adjusting this air gap, which may be configured by a processor, such as the processor 111e described with respect to FIG. 1, via piezoelectric or electrostatic means, for example, the capacitance of the structure may be altered, adjusting the filter frequency. The filtered output signal may be communicated out of the CPW-BPF 325 at the plus and minus outputs labeled as "Out" in FIG. 3D.

Figure 4:
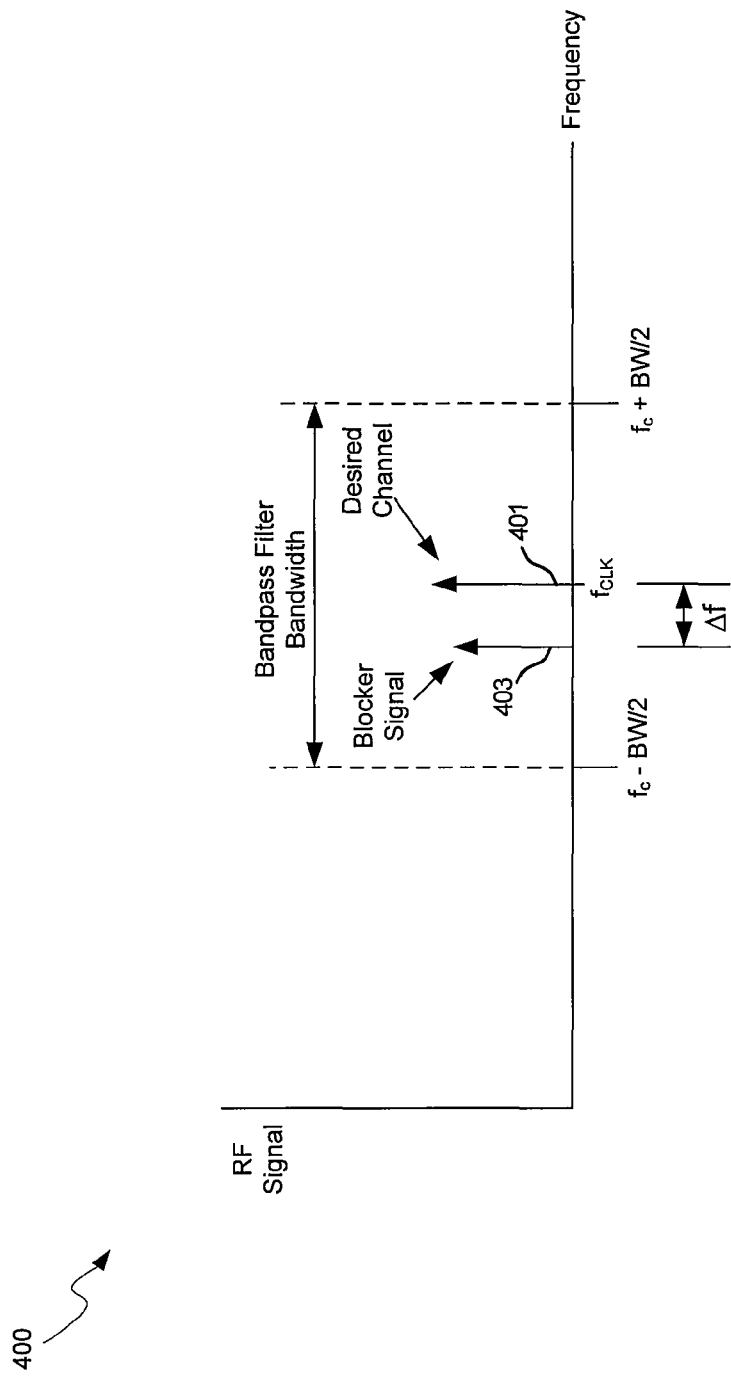
FIG. 4 is a block diagram illustrating a desired RF signal and a blocker signal, in accordance with an embodiment of the invention.

FIG. 4 is a block diagram illustrating a desired RF signal and a blocker signal, in accordance with an embodiment of the invention. Referring to FIG. 4, there is shown an RF signal versus frequency plot. The desired channel 401 may comprise the signal at the desired frequency, and the blocker signal 403 may comprise an undesirable interfering channel. The difference in frequency between the two signals, $\Delta f$, may be utilized by the blocker signal filtering system, described with respect to FIG. 2, to configure the adjustable time delay, $T_d$.

The center frequency and bandwidth of the filter may be adjustable to allow for channel selection. In addition, the bandwidth may be adjusted to match that of the desired channel. Applying the received RF signal to a bandpass filter centered at the desired channel frequency may result in the unwanted channels being filtered out. The filtered signal may then be undersampled, by the S/H circuits 205A and 205B, for example. The desired baseband signal may be generated by subtracting the two undersampled signals.

Figure 5:
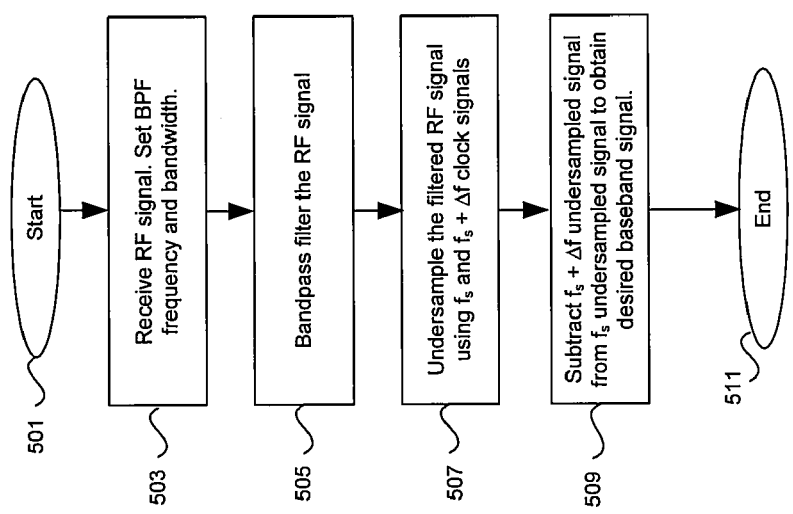
FIG. 5 is a flow diagram illustrating a dual-undersampling blocker signal cancellation process, in accordance with an embodiment of the invention.

FIG. 5 is a flow diagram illustrating a dual-undersampling blocker signal cancellation process, in accordance with an embodiment of the invention. Referring to FIG. 5, after start step 501, in step 503, the RF signal may be received and the center frequency and bandwidth of the microstrip or coplanar waveguide bandpass filter may be set. In step 505, the signal may be filtered by the microstrip or coplanar waveguide bandpass filter, such that unwanted channels may be removed. In step 507, the filtered RF signal may be undersampled by two S/H circuits, both at a sampling frequency of $f_s$, but one with a time delay, corresponding to the frequency difference between the desired signal and a blocker signal. In step 509, the signal generated by subsampling at $f_s$ with the time delay $T_d$, may be subtracted from the signal generated by the S/H circuit 205A, resulting in the desired baseband signal without the blocker signal, followed by end step 511.

In an embodiment of the invention, a method and system are disclosed for band-limiting a received wireless signal utilizing a programmable bandpass filter 325/350, generating a first signal 221 by undersampling the signal utilizing a clock signal 215 and generating a second signal 219 by undersampling the signal utilizing the clock signal 215 with an added time delay, $T_d$, incorporated by the processor 111e. The second signal 219 may be subtracted from the first signal 221. The programmable bandpass filter 325/350 may comprise a microstrip 350 and/or a coplanar waveguide 325 bandpass filter. The added time delay, $T_d$, may be variable, and may be defined as an inverse of a difference between the desired channel and a blocker signal, $\Delta f$. The bandwidth of the programmable bandpass filter 325/350 may be centered at the desired channel. The clock signal 213 may be generated at a frequency, $f_{CLK}$, which may be an integer sub-harmonic of the desired channel, and may be greater than twice a bandwidth of the programmable bandpass filter 325/350. The time delay, $T_d$, may be controlled by a programmable delay circuit 213, which may comprise CMOS inverters.

Certain embodiments of the invention may comprise a machine-readable storage having stored thereon, a computer program having at least one code section for utilizing undersampling to remove in-band blocker signals, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   in a wireless receiver,
      band-limiting a received wireless signal utilizing a programmable bandpass filter;
      centering said bandwidth of said programmable bandpass filter at a desired channel of said received wireless signal;
      generating a first signal by undersampling said band-limited received wireless signal utilizing a clock signal;
      generating a second signal by undersampling said band-limited received wireless signal utilizing a delayed version of said clock signal,
   wherein a delay of said delayed version of said clock signal is configured as an inverse of a frequency difference between said desired channel and a blocker signal; and
      subtracting said second signal from said first signal.

2. The method according to claim 1, wherein said programmable bandpass filter comprises a microstrip bandpass filter.

3. The method according to claim 1, wherein said programmable bandpass filter comprises a coplanar waveguide bandpass filter.

4. The method according to claim 1, comprising varying said delayed version of said clock signal.

5. The method according to claim 1, comprising generating said clock signal at a frequency which is an integer sub-harmonic of said desired channel.

6. The method according to claim 5, wherein said clock signal frequency is greater than twice a bandwidth of said programmable bandpass filter.

7. The method according to claim 1, comprising generating said delayed version of said clock signal utilizing a programmable delay circuit.

8. The method according to claim 7, wherein said programmable delay circuit comprises CMOS inverters.

9. A system for wireless communication, the system comprising:
   one or more circuits in a wireless receiver that enable band-limiting a received wireless signal utilizing a programmable bandpass filter;
   said one or more circuits centers said bandwidth of said programmable bandpass filter at a desired channel of said received wireless signal;
   said one or more circuits generate a first signal by undersampling said band-limited received wireless signal utilizing a clock signal;
   said one or more circuits generate a second signal by undersampling said band-limited received wireless signal utilizing said clock signal with an added time delay, wherein a delay of said delayed version of said clock signal is configured as an inverse of a frequency difference between said desired channel and a blocker signal; and
   said one or more circuits subtract said second signal from said first signal.

10. The system according to claim 9, wherein said programmable bandpass filter comprises a microstrip bandpass filter.

11. The system according to claim 9, wherein said programmable bandpass filter comprises a coplanar waveguide bandpass filter.

12. The system according to claim 9, wherein said one or more circuits varies said delayed version of said clock signal.

13. The system according to claim 11, wherein said one or more circuits enable generation of said clock signal at a frequency which is an integer sub-harmonic of said desired channel.

14. The system according to claim 13, wherein said clock signal frequency is greater than twice a bandwidth of said programmable bandpass filter.

15. The system according to claim 9, wherein said one or more circuits enable generation of said delayed version of said clock signal utilizing a programmable delay circuit.

16. The system according to claim 15, wherein said programmable delay circuit comprises CMOS inverters.

* * * * *